2,425,211

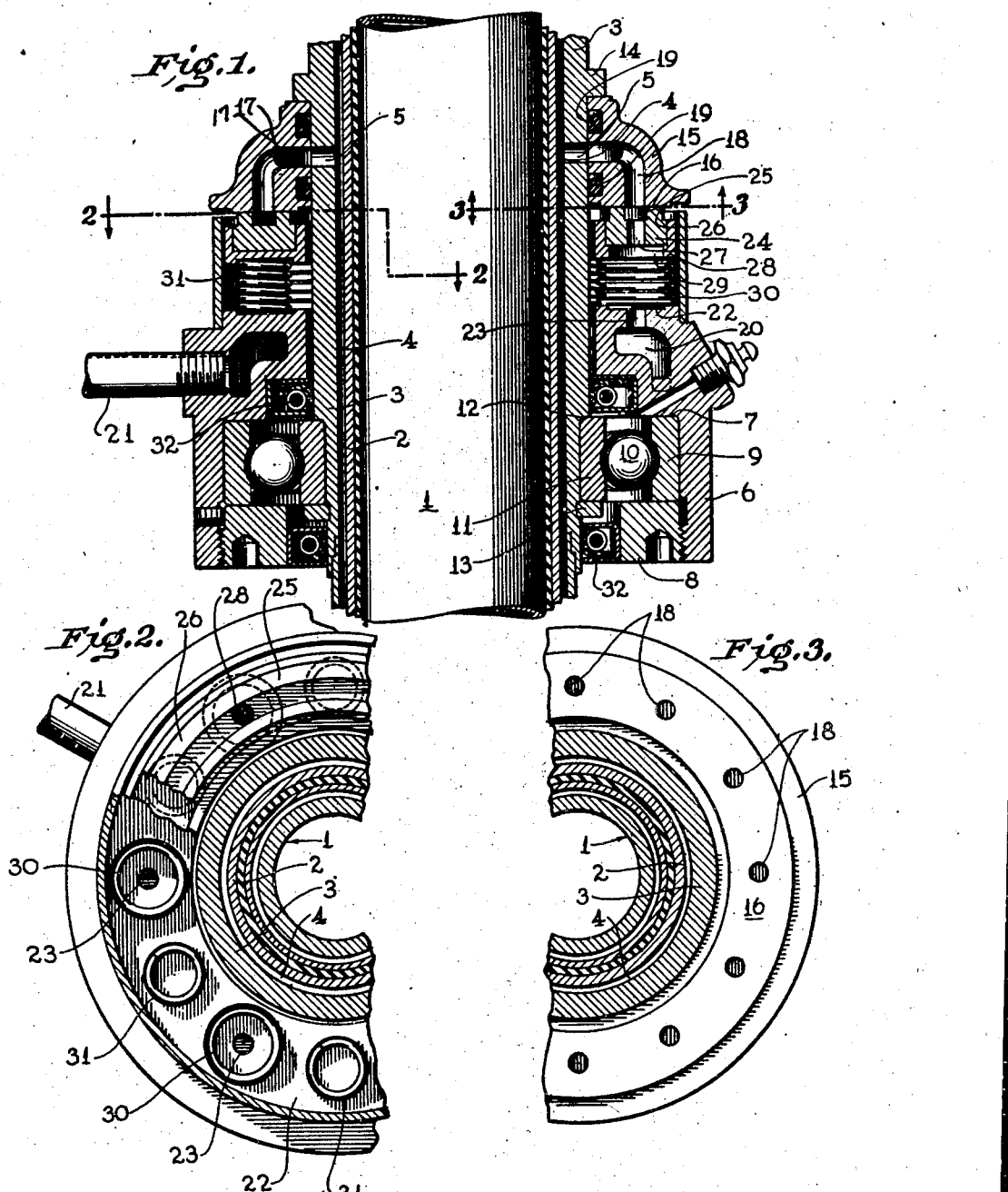
Aug. 5, 1947.  H. A. STRICKLAND, JR  2,425,211
ROTARY SEAL
Filed July 4, 1945
Harold A. Strickland, Jr.
INVENTOR
BY
ATTORNEY Patented Aug. 5, 1947

UNITED STATES PATENT OFFICE 2,425,211

ROTARY SEAL

Harold A. Strickland, Jr., Detroit, Mich., assignor, by mesne assignments, to The Budd Company, Philadelphia, Pa., a corporation of Pennsylvania Application July 4, 1945, Serial No. 603,198

5 Claims. (Cl. 285—96.3)

This invention relates to fluid-tight rotary seals, and particularly to seals of the type wherein fluid under pressure is transferred from a stationary to a rotary member or vice versa.

The primary object of the present invention is to provide a fluid-tight rotary seal of new and improved construction which can be economically manufactured and which in use occupies minimum axial space.

Another object is to provide a fluid-tight rotary seal having rotatably engaged parts concentrically arranged with respect to a rotatable member and in which one of the parts is balanced for perfect sealing engagement with the other part.

With the above and other objects in view, which will be apparent to those skilled in the art to which the invention appertains, the present invention consists in certain features of construction and combinations of parts to be hereinafter described with reference to the accompanying drawing, and then claimed.

In the drawing which illustrates a suitable embodiment of the invention,

Figure 1 is a longitudinal section through apparatus in which the present invention is incorporated;

Figure 2 is a fragmentary setcion taken substantially on the line 2—2 of Figure 1 and showing portions of the seal at two different planes; and Figure 3 is a transverse section taken on line 3—3 of Figure 1.

Referring to the accompanying drawing, the apparatus in which the present invention is incorporated includes a rotary arbor or mandrel 1 having inner and outer parts 2 and 3 provided with fluid passageways 4 therebetween, the outer member 3 having ports 5 for conducting fluid to or from the passageways 4.

The mandrel 1 is rotatably supported within a bearing comprised of an outer casing 6 having a shoulder 7 and an annular ring 8 threaded thereinto, which ring and shoulder securely clamp the outer race 9 of a roller bearing 10 therebetween. The inner race 11 surrounds the outer part 3 and is clamped against a shoulder 12 thereof by a locking ring 13.

Axially spaced from the shoulder 12 is a circumferential shoulder 14 and surrounding the outer part 3 in abutting relation to the shoulder 14 is an annular rotatable member 15 having a flat bearing face 16 concentric with the outer part 3 and disposed in a transverse plane perpendicular to the axis of the arbor. This member 15 has a circumferential collector recess 17 in its inner face disposed in the transverse plane of the ports 5, and a plurality of passages 18 leading from the recess 17 and opening through the bearing face 16. Member 15 has a fluid-tight seal with the outer part 3 and if desired additional seals or packings 19 may be employed at the opposite sides of the recess 17.

The bearing casing 6 extends beyond the shoulder 7 and is provided with an annular fluid passage 20 therein having a fluid outlet or inlet conduit 21, as the case may be, and with a transverse face 22 provided with ports 23 which communicate with the passage 20.

Engaged with the face 16 of the annular member 15 is an annular bearing ring 24 having an annular collector passage 25 in the flat face 26 thereof and ports 27 extending from the bottom of passage 25. The ring 24 is seated in a ring 28 of channel-shaped cross section, the ring 28 having enlarged openings 29 underlying the ports 27. Disposed between the ring 28 and the transverse face 23 of casing 6 are a plurality of circumferentially spaced compression springs 31 which maintain the face 26 of the bearing ring 24 in pressure bearing engagement with the face 16 of the rotatable annular member 15.

The transmission of fluid between the ports 23 of the casing 6 and the ports 27 of ring 24 is accomplished by the provision of a plurality of bellows or annular expansible-contractible elements 30, there being one such element for each pair of ports 23 and 27. As to each of the elements 30, one end is secured in fluid-tight engagement to the face 22 of casing 6 in surrounding relation with respect to a port 23 and the opposite end is secured in fluid-tight engagement to the ring 28 in surrounding relation with respect to an opening 29.

As shown in the drawing, suitable lubricant retaining seals 32 are provided at the opposite sides of bearing 10.

During rotation of the arbor 1, fluid under pressure flows from chamber 20 through ports 23, bellows 30 and ports 27 into the collector recess 25 from whence it flows into the passages 18 of the rotating member 15 and thence into recess 17 and ports 5 to the passages 4 for cooling of the arbor 1 or for any other desired purpose. It is to be understood, of course, that the fluid may flow in the reverse direction.

The faces 16 and 26 have a ground fit or bearing engagement and by reason of the balanced pressure produced between the fluid within the bellows 30 and the fluid on the recess 25 only the spring pressure is applied against the sealing surfaces providing an efficient fluid-tight rotating seal without excess wear.

It is to be understood that various changes may be made in the detailed construction and arrangement of the parts described without departing from the spirit and substance of the invention, the scope of which is defined by the appended claims.

What is claimed is:

1. A rotary fluid seal for effecting the transfer of fluid between an annular passage of an annular stationary member having an annular end wall and a port in the wall of a passaged rotary member within the stationary member, comprising a pair of annular elements surrounding said rotary member and having cooperative annular bearing faces coaxial with said rotary member, one of said elements being axially spaced from the end wall of said stationary member and the other of said elements being secured to said rotary member for rotation therewith, a plurality of compression springs between said one element and said end wall urging said one element in pressure bearing engagement with the other element, and a plurality of hollow open ended members between said end wall and said one element and having their ends in sealed engagement therewith, said stationary member having fluid ports between the passage thereof and the interiors of said hollow elements, said one element having fluid ports opening from the interiors of said hollow open ended members through its said face and said other element having at least one passage between its said face and the port of said rotary member, one of said faces having an annular coaxial recess providing a distributing chamber between said faces.

2. A rotary fluid seal for effecting the transfer of fluid between an annular passage of an annular stationary member having an annular end wall and a port in the wall of a passaged rotary member within the stationary member, comprising a pair of annular elements surrounding said rotary member and having cooperative annular bearing faces coaxial with said rotary member, one of said elements being axially spaced from the end wall of said stationary member and the other of said elements being secured to said rotary member for rotation therewith, a plurality of compression springs between said one element and said end wall urging said one element in pressure bearing engagement with the other element, and a plurality of hollow open ended members between said end wall and said one element and having their ends in sealed engagement therewith, said stationary member and said pair of annular elements having a plurality of passageways placing said passageway of said stationary member in communication with said port of said rotary member and one of said bearing faces having an annular coaxial distributing recess therein between the passages of said pair of annular elements.

3. A rotary fluid seal for effecting the transfer of fluid between an annular passage of an annular stationary member having an annular end wall and a ported portion of a passaged rotary member, comprising a pair of cooperative annular elements adjacent one end of said rotary member and having annular faces bearing against each other, said faces being coaxial with said rotary member, one of said elements being secured about the ported portion of said rotary member in fluid-tight engagement therewith and having a circumferential passage surrounding the ports of said ported portion, a plurality of open-ended hollow expansible-contractible elements between the end wall of the stationary member and the other of said annular elements and secured thereto in fluid-tight engagement, and resilient means between said end wall and said other annular element urging said other annular element into uniform axial bearing engagement with said one annular element, said stationary member and said pair of annular elements having a plurality of passageways placing the passage of said stationary member in communication through the hollows of said expansible-contractible elements with the circumferential passage of said one annular element, one of said bearing faces having a coaxial annular recess common to the passageways of said pair of annular elements.

4. In a rotary vertical shaft and a stationary surrounding bearing element in which the shaft has a ported wall portion and the bearing element has an upper annular ported end wall defining one wall of an annular fluid chamber, means providing for the transfer of fluid under pressure between the ports of the ported shaft portion and said chamber comprising a plurality of vertical hollow bellows members secured at one end in fluid-tight relation to said end wall and communicating through the ports in said end wall with said chamber, an annular ring surrounding said shaft and secured in fluid-tight relation to the other ends of said bellows members, upper and lower annular fluid transfer elements surrounding said shaft and having adjacent annular bearing faces coaxial with and disposed in a plane at ninety degrees to the axis of said shaft, said upper element being secured to the ported portion of said shaft in fluid-tight relation and said lower portion being rigidly secured to said ring, and a plurality of spring means urging said ring toward said upper element to maintain said bearing faces in fluid-tight bearing engagement, said upper and lower elements having passageways placing the interior of said bellows members and the ports of said ported shaft portion in fluid communication with each other through said bearing faces.

5. In a rotary vertical shaft and a stationary surrounding bearing element in which the shaft has a ported wall portion and the bearing element has an upper annular ported end wall defining one wall of an annular fluid chamber, means providing for the transfer of fluid under pressure between the ports of the ported shaft portion and said chamber comprising a plurality of vertical hollow bellows members secured at one end in fluid-tight relation to said end wall and communicating through the ports in said end wall with said chamber, an annular ring surrounding said shaft and secured in fluid-tight relation to the other ends of said bellows members, upper and lower annular fluid transfer elements surrounding said shaft and having adjacent annular bearing faces coaxial with and disposed in a plane at ninety degrees to the axis of said shaft, said upper element being secured to the ported portion of said shaft in fluid-tight relation and said lower portion being rigidly secured to said ring, and a plurality of spring means urging said ring toward said upper element to maintain said bearing faces in fluid-tight bearing engagement, said upper and lower elements having passageways placing the interior of said bellows members and the ports of said ported shaft portion in fluid communication with each other through said bearing faces, the passageways in said lower element being of lesser diameter than the passageways of said ring whereby to provide said upper element with face portions within said bellows members subject to the pressure of the fluid within said bellows members.

HAROLD A. STRICKLAND, Jr.

REFERENCES CITED

The following references are of record in the file of this patent:

UNITED STATES PATENTS

| Number | Name | Date |
| --- | --- | --- |
| 2,343,491 | Bard et al. | Mar. 7, 1944 |
| 2,393,835 | Stevensen | Jan. 29, 1946 |
| 1,260,686 | Kingsbury | Mar. 26, 1918 |
| 2,230,881 | Browne | Feb. 4, 1941 |